(12) United States Patent
Hatcher

(10) Patent No.: US 8,061,751 B2
(45) Date of Patent: Nov. 22, 2011

(54) EXTENDABLE REACHING TOOL

(75) Inventor: Stephen D Hatcher, Dillsburg, PA (US)

(73) Assignee: Ames True Temper, Inc., Camp Hill, PA (US)

( * ) Notice: Subject to any disclaimer, the term of this patent is extended or adjusted under 35 U.S.C. 154(b) by 439 days.

(21) Appl. No.: 12/412,858

(22) Filed: Mar. 27, 2009

(65) Prior Publication Data

US 2010/0244475 A1    Sep. 30, 2010

(51) Int. Cl.
*B66F 19/00* (2006.01)
(52) U.S. Cl. .................................. 294/209; 294/115
(58) Field of Classification Search ............... 294/19.2, 294/115, 209, 210; 30/248, 257
See application file for complete search history.

(56) References Cited

U.S. PATENT DOCUMENTS

| | | |
|---|---|---|
| 877,389 A | 1/1908 | Werd |
| 2,579,536 A | 12/1951 | Barr |
| 2,616,741 A | 11/1952 | Ziese |
| 3,733,098 A | 5/1973 | Tobias |
| 3,986,743 A | 10/1976 | Bjurling et al. |
| 4,093,296 A | 6/1978 | Itoh |
| 4,398,759 A | 8/1983 | Manola |
| 4,647,094 A | 3/1987 | Bergkvist et al. |
| 5,099,539 A * | 3/1992 | Forester ............... 15/144.3 |
| 5,176,702 A | 1/1993 | Bales et al. |
| 5,480,409 A | 1/1996 | Riza |
| 5,593,196 A | 1/1997 | Baum et al. |
| 5,620,447 A | 4/1997 | Smith et al. |
| 5,765,442 A * | 6/1998 | Judson ..................... 74/481 |
| 5,766,196 A | 6/1998 | Griffiths |
| 5,833,692 A | 11/1998 | Cesarini et al. |
| 6,223,628 B1 | 5/2001 | Barron |
| 6,241,736 B1 | 6/2001 | Sater et al. |
| 6,257,634 B1 * | 7/2001 | Wei .......................... 294/111 |
| 6,513,844 B1 * | 2/2003 | Hsu ........................... 294/210 |
| 6,571,479 B1 | 6/2003 | Wu |
| 6,739,637 B2 * | 5/2004 | Hsu ........................... 294/210 |
| 6,796,587 B2 * | 9/2004 | Tsou .......................... 294/1.4 |

* cited by examiner

*Primary Examiner* — Saul Rodriguez
*Assistant Examiner* — Stephen Vu
(74) *Attorney, Agent, or Firm* — Eckert Seamans Cherin & Mellott, LLC; David C. Jenkins, Esquire

(57) ABSTRACT

An extendable tool having an internal drive assembly is disclosed. The extendable components of the internal drive assembly are two, or more, telescoping drive shafts each having an alignment structure. The alignment structure ensures that the drive shafts generally maintain their circumferential alignment relative to each other, i.e. the shafts rotate together and maintain their orientation, while allowing the drive shafts to slide axially relative to each other. In one embodiment the drive shafts have a non-circular cross-section, and more preferably, a square cross-section. Each inner drive shaft has a cross-sectional area that is slightly smaller than the next larger outer drive shaft. Thus, the drive shafts may slide axially relative to each other. However, when the drive shafts are rotated, the non-circular shape causes the inner drive shaft and the larger outer drive shaft to engage each other and rotate together.

19 Claims, 8 Drawing Sheets

EXTENDABLE REACHING TOOL

BACKGROUND OF THE INVENTION

1. Field of the Invention

This invention relates to extendable tools and, more specifically, to an extendable reaching tool.

2. Background Information

Extendable tools are typically used to interact with overhead objects that may be close or remote. For example, a fruit picker may be able to reach fruit on the bottom of a tree by hand, need a short tool for slightly higher fruit, and a longer tool for fruit near the top of the tree. An extendable tool typically includes an extendable shaft having one or more hollow members disposed in a telescoping relationship. Thus, a user may collapse the shaft when working on/with a close object, or, extend the shaft members when working on a remote object. The shaft members are typically maintained in place by a pin passing through at least two shaft members or a compressive collar.

Some extendable tools have fixed tool heads, e.g. a dust mop, or a flexible tool head, e.g. a device for swapping out light bulbs that has spring-like fingers. As used herein, such devices are not actuatable tool head assemblies as used herein. Other extendable tools include a hand powered actuatable tool head assembly having movable elements, such as, but not limited to, a tree pruner. Such devices typically have a movable blade and a stationary blade/anvil, or, two moving blades. Such extendable tools with an actuatable tool head assembly require a drive assembly in order to allow the user at the bottom end of the extendable tool to actuate the tool head at the upper end of the extendable tool. Devices such as a traditional tree pruner have an external drive assembly, typically including a rope and at least one pulley. Such external drive assemblies are prone to damage, entanglement and other problems.

Internal drive assemblies for extendable tools are typically complex assemblies that are difficult and/or time consuming to assemble. Such internal drive assemblies are complex because the elements must be operable in both the retracted and extended configurations of the handle shaft, but remain enclosed within the shaft where the user cannot, typically, reach the drive assembly elements. That is, for example, the user is not able to access and actuate a locking assembly structured to lock the internal drive assembly components in either the extended or retracted configurations.

One solution is to provide a handle shaft with an access opening to the "internal drive assembly components." Of course, this is not a true internal drive assembly, but rather a partially enclosed external drive assembly. Such assemblies are also prone to clogging with debris, damage, entanglement and other problems. Another solution is to provide a tension member, typically a rope, that is looped about pulleys structured to move together as the shafts move apart. Other internal drive assemblies rely upon rigid drive rods having linking assemblies with ratchet-and-pawl type connectors, see U.S. Pat. No. 6,513,844 (FIG. 6), or connector pins that pass through both drive rods, see U.S. Pat. No. 6,571,479 (FIG. 2-B). Such devices require the internal components to align properly as the user extends/collapses the shaft. Unfortunately, such devices do not always operate as intended and alignment is adversely affected over time as the internal components degrade and/or rust.

SUMMARY OF THE INVENTION

The disclosed and claimed concept provides for an inexpensive and easy to assemble extendable tool having an internal drive assembly. The extendable components of the internal drive assembly are two, or more, telescoping drive shafts each having an alignment structure. The alignment structure ensures that the drive shafts generally maintain their circumferential alignment relative to each other, i.e. the shafts rotate together and maintain their orientation, while allowing the drive shafts to slide axially relative to each other. In one embodiment the drive shafts have a non-circular cross-section, and more preferably, a square cross-section. Each inner drive shaft has a cross-sectional area that is slightly smaller than the next larger outer drive shaft. Thus, the drive shafts may slide axially relative to each other. However, when the drive shafts are rotated, the non-circular shape causes the inner drive shaft and the next larger outer drive shaft to engage each other and rotate together.

The drive shafts are coupled to an actuator at the lower end of the extendable tool and an actuatable tool head assembly disposed at the top end of the extendable tool. Further, because a twisting motion may not be particularly useful at the actuatable tool head assembly, the internal drive assembly may include one or more conversion devices that convert rotational motion to/from another type of motion, typically a linear motion. Thus, in one embodiment, the actuator, which is disposed at the lower end of the extendable tool, is a rotatable grip, preferably a hand sized D-ring. This embodiment requires the user to grip the handle/shaft of the extendable tool to prevent the entire tool from rotating when the actuator is twisted. In another one-handed embodiment, a squeezable actuator is disposed at the lower end of the extendable tool and may be incorporated into a handle assembly. The squeezable actuator is coupled to a lower conversion device. The lower conversion device is structured to convert a generally linear motion to a rotational motion. The lower conversion device is also coupled to the drive shafts and provides rotational motion thereto. An upper conversion device is disposed at the upper end of the tool and converts the rotational motion back into a generally linear motion. This generally linear motion is applied to the actuatable tool head assembly.

While the actuatable tool head assembly may be any type of tool that utilizes a generally linear motion, the following discussion will use a tool having a jaw assembly as an example, more specifically a reaching tool that may be used to grip objects between the two jaws.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, "generally linear," when used to describe the motion of the handle lever second end, includes an arcuate motion over a small arc. That is, when the radius of the arc is substantially larger than the length of the arc, the motion is "generally linear."

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body.

However, as used herein, a "fixed location" means that two or more elements do not change their relative locations while the elements themselves may move. For example, axles on a vehicle are in a "fixed location" relative to the carriage and each other, but the axles may each rotate.

As used herein, directional phrases are relative to the orientation of the extendable tool as shown in the figures and are not limiting in the claims. Noting that extendable tools are typically used to reach work locations above a user's head, as used herein the "lower" end of the extendable tool is the end opposite the actuatable tool head assembly.

It is further noted that telescoping shafts may have two or more shaft members so long as each inner member is slightly smaller in cross-sectional area than the next outer member. In the following discussion an extendable tool having two handle shaft members and two drive shaft members are disclosed. However, it is understood that more handle/drive shaft members may be used so long as the shaft members are coupled in a telescoping manner.

Figure 1:
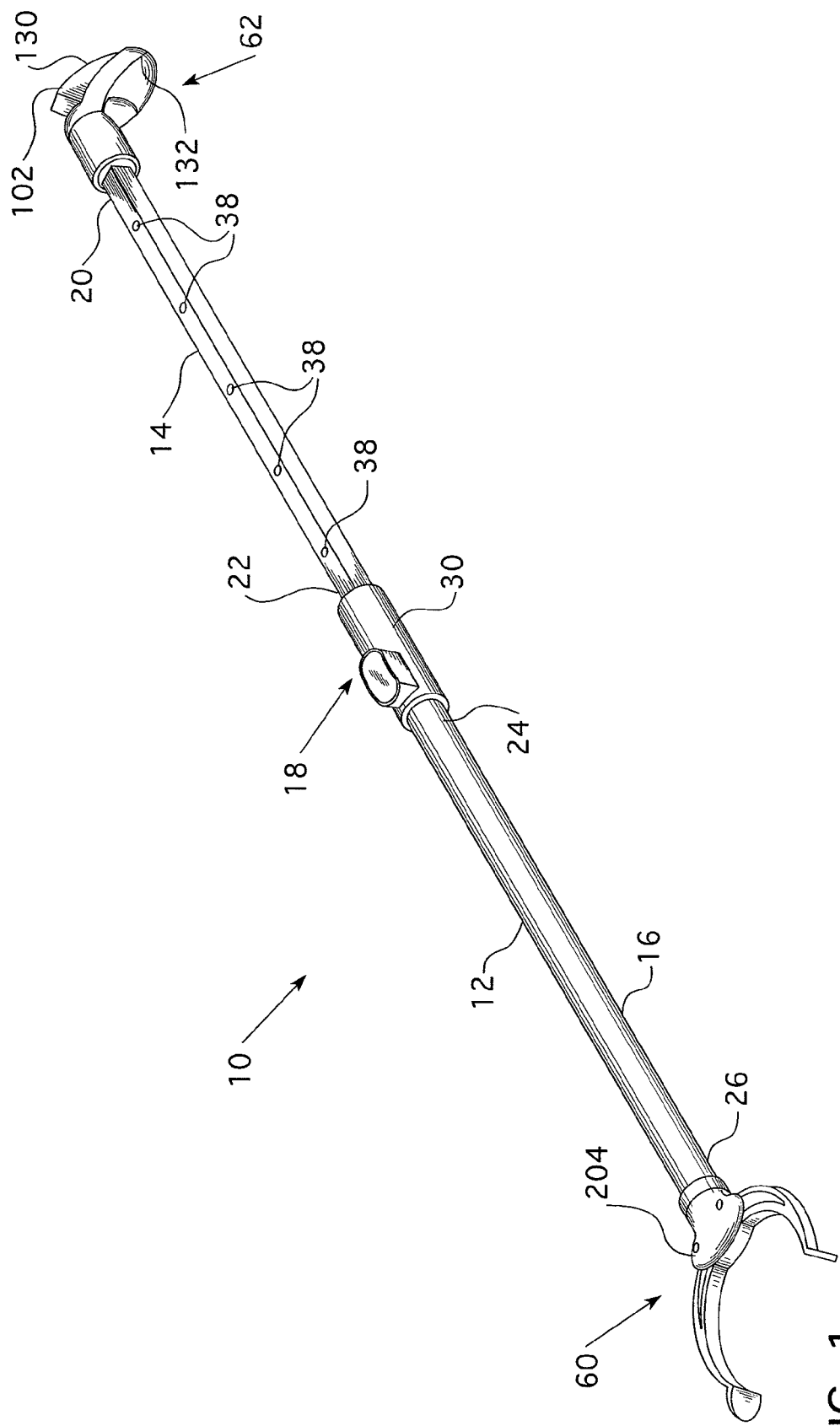
FIG. 1 is an isometric view of an extendable tool.

As shown in FIG. 1, an extendable tool 10 includes a handle shaft assembly 12 and an actuatable tool head assembly 60. The handle shaft assembly 12 includes a handle inner shaft 14, a handle outer shaft 16, and a positioning assembly 18. Both the handle inner shaft 14 and the handle outer shaft 16 are elongated, rigid, and hollow members. The handle outer shaft 16 has a cross-sectional area that is larger than the handle inner shaft 14 and, as such, the handle inner shaft 14 is structured to be slidably disposed in the handle outer shaft 16. That is, the handle inner shaft 14 is structured to slide in an axial direction when disposed within the handle outer shaft 16. The handle inner shaft 14, being slidably disposed within the outer shaft 16, is axially movable between a plurality of positions whereby the extendable tool 10 may be configured to have different lengths. As noted below, the positioning assembly 18 may temporarily fix the length of the extendable tool 10 in a number of different lengths, however, in the description that follows will, generally, only refer to the shortest length, hereinafter the retracted first, position, and the longest length, hereinafter the extended, second position.

The handle inner shaft 14 has a lower first end 20 and an upper second end 22. The handle outer shaft 16 has a lower first end 24 and an upper second end 26. As shown in the Figures, a grip 62 (discussed below) is disposed at the handle inner shaft lower first end 20 while the actuatable tool head assembly 60 is disposed at the handle outer shaft upper second end 26. It is understood, however, that this configuration may be reversed. That is, the actuatable tool head assembly 60 could be disposed at the handle inner shaft lower first end 20 and the grip 62 could be disposed at the handle outer shaft upper second end 26.

Figure 2:
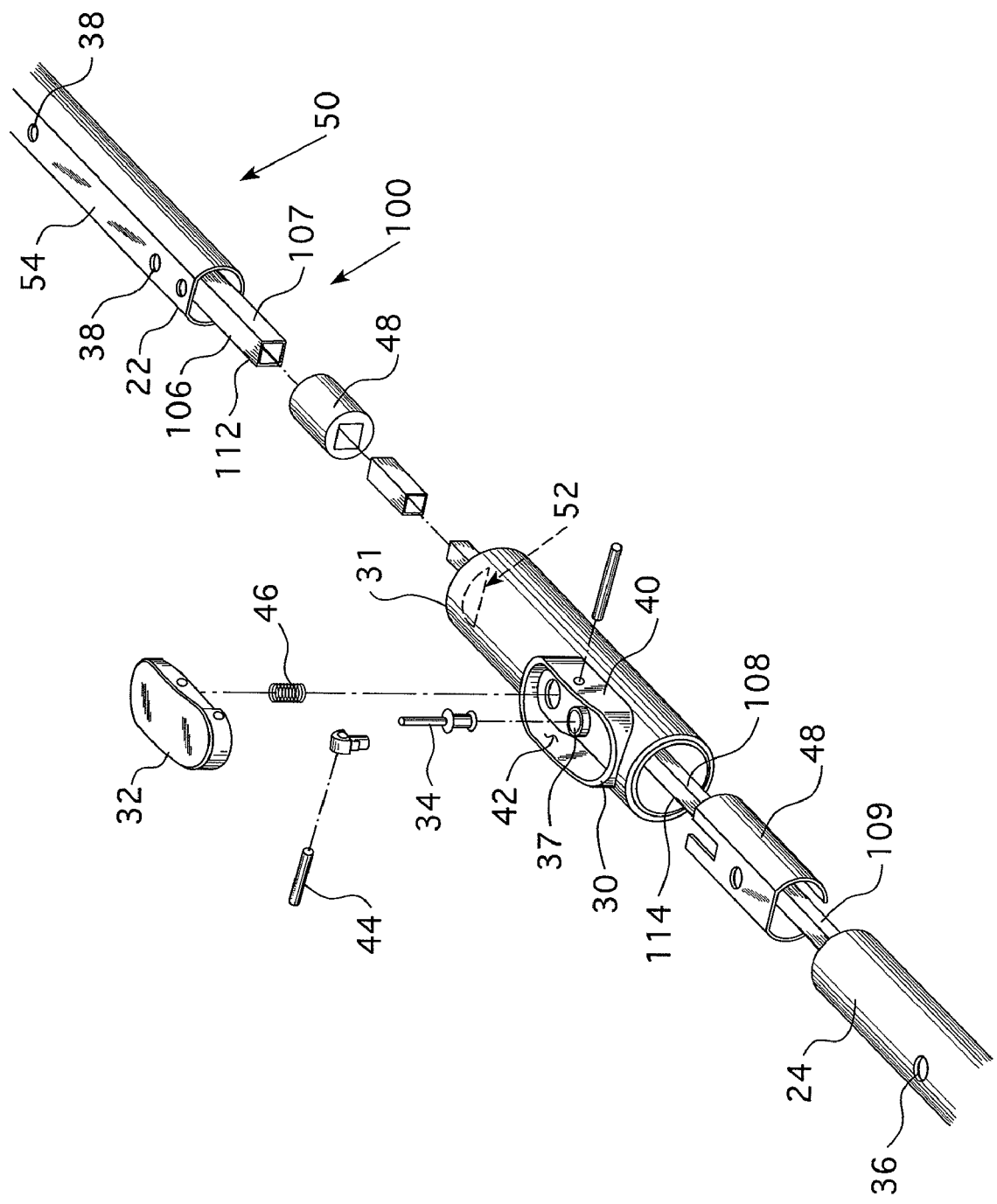
FIG. 2 is an exploded view of an extendable tool at the positioning assembly.
Figure 3:
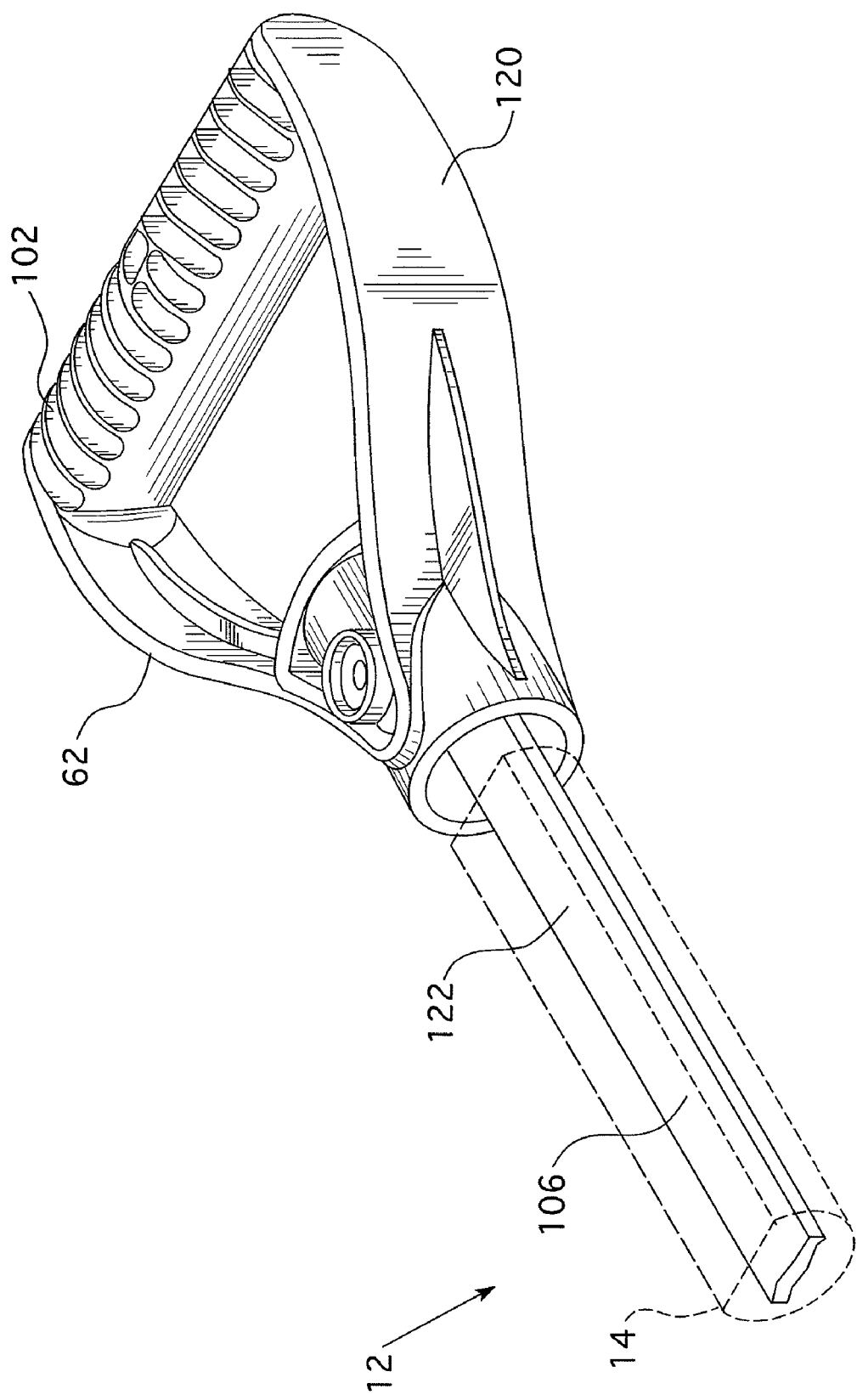
FIG. 3 is an isometric, detail view of an alternate actuator.
Figure 4:
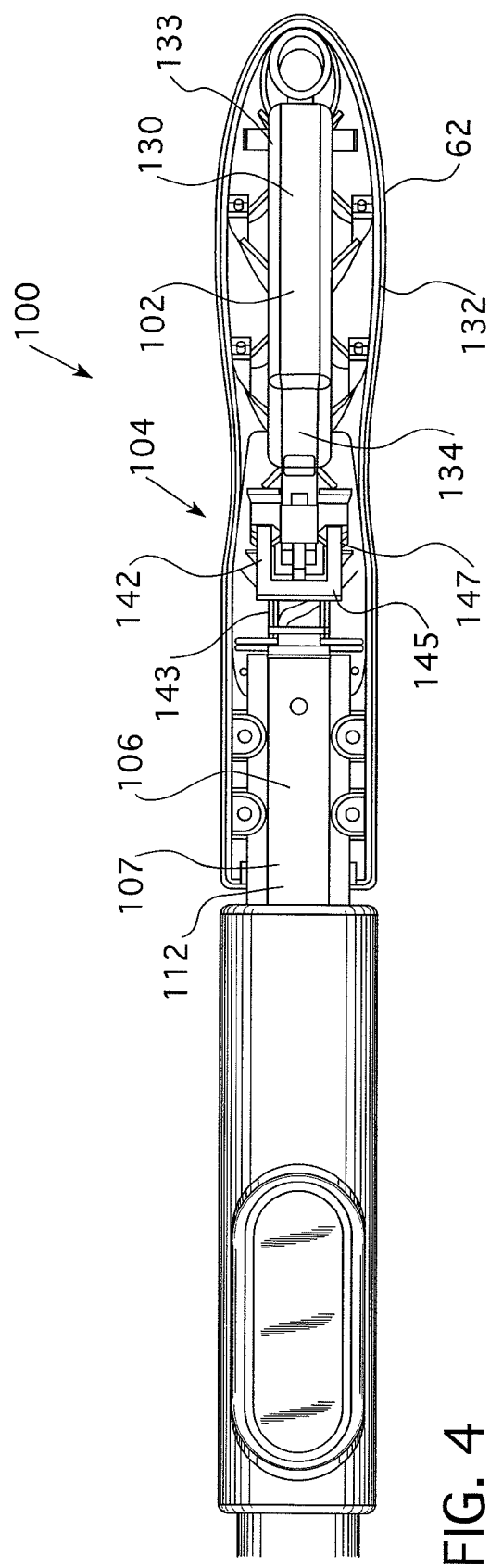
FIG. 4 is a top cross-sectional view of the extendable tool lower end.

The positioning assembly 18 is structured to maintain the handle inner shaft 14 and the handle outer shaft 16 in a temporarily fixed relationship. The positioning assembly 18 is further structured to maintain the orientation of the handle inner shaft 14 and the handle outer shaft 16 relative to each other. The positioning assembly 18, as shown in FIG. 2, includes a housing 30, a rocking member 32, a locking pin 34, an opening 36 in the handle outer shaft 16, a plurality of openings 38 in the handle inner shaft 14, optional guide members 48 and an orienting structure 50. The positioning assembly housing 30 is a hollow, tubular member sized to fit snugly over the handle outer shaft 16. The positioning assembly housing 30 is coupled, and preferably fixed, to the handle outer shaft lower first end 24. Preferably, an extension portion 31 of the positioning assembly housing 30 extends beyond the outer shaft lower first end 24. The hollow positioning assembly housing 30 and the hollow handle outer shaft 16 form a continuous passage. The positioning assembly housing 30 overlays the handle outer shaft opening 36 and includes a corresponding opening 37. That is, there is a passage through the handle outer shaft opening 36 and the positioning assembly housing opening 37 from the outer side of the handle outer shaft 16 to a location within the handle outer shaft 16.

The positioning assembly housing 30 provides a pivot point for the rocking member 32. As shown, the positioning assembly housing 30 includes a collar 40 forming an enclosed area 42 and having a pin 44 extending across the enclosed area 42. The rocking member 32 is coupled to the positioning assembly housing pin 44 and structured to rock between two positions as described below. The locking pin 34 is disposed on the lower side of one end of the rocking member 32 and is aligned with the handle outer shaft opening 36 and the positioning assembly housing opening 37. A spring 46 may be disposed between the rocking member 32 and the positioning assembly housing 30. The spring 46 contacts the rocking member 32 on the opposite side of the positioning assembly housing pin 44 from the locking pin 34. In this configuration, the locking pin 34 is biased into the handle outer shaft opening 36 and the positioning assembly housing opening 37.

The positioning assembly orienting structure 50 is structured to maintain the orientation of the handle inner shaft 14 and the handle outer shaft 16 relative to each other. Generally, this is accomplished by providing the outer surface of the handle inner shaft 14 and the inner surface of the handle outer shaft 16 with a noncircular, corresponding cross-sectional shape. For example, the bodies of handle inner shaft 14 and the handle outer shaft 16 could have a oval, square, etc., cross-sectional shape. In the preferred embodiment, however, the handle outer shaft 16 has a generally circular outer surface as that shape is generally more pleasing to the eye. The housing 30 is fixed to the outer shaft 16, e.g. mechanically, by adhesives, welding, etc., so that the housing 30 cannot rotate relative to the outer shaft 16. In this embodiment, the positioning assembly orienting structure 50 is one or more ribs 52 disposed on the inner side of the housing extension portion 31. The ribs 52 extend as chords across the generally circular passage formed by the handle outer shaft 16 and the positioning assembly housing 30. Thus, a corresponding portion of the positioning assembly orienting structure 50 is a flat 54 formed on the handle inner shaft 14, That is, the handle inner shaft 14 has a cross-sectional shape similar to a capital letter "D." Thus, when the handle inner shaft 14 is disposed through the passage formed by the handle outer shaft 16 and the positioning assembly housing 30, the handle inner shaft flat 54 must face, that is, be adjacent to, the housing extension portion ribs 52. Further, as the handle inner shaft 14 moves between the retracted and extended positions, the housing extension portion ribs 52 will, substantially, prevent the handle inner shaft 14 from rotating relative to the handle outer shaft 16.

The handle inner shaft plurality of openings 38 are longitudinally aligned, and may conveniently be disposed on the handle inner shaft flat 54. The handle inner shaft plurality of openings 38 are further positioned so as to align with the passage through the handle outer shaft opening 36 and the positioning assembly housing opening 37 as the handle inner shaft 14 moves between the retracted and extended positions. The rocking member 32 is structured to rock between a first position, wherein the locking pin 34 extends through the passage through the handle outer shaft opening 36 and the positioning assembly housing opening 37 and one of the handle inner shaft plurality of openings 38, and a second position, wherein the locking pin 34 does not extend through one of the handle inner shaft plurality of openings 38. When the rocking member 32 is in the first position, the handle inner shaft 14 and the handle outer shaft 16 are in a temporarily fixed position relative to each other. The various guide members 48 are positioned within the orienting structure 50 adjacent the interfaces of the various shafts.

To change the length of the extendable tool, the user moves the rocking member 32 to the second position, wherein the locking pin 34 does not extend through one of the handle inner shaft plurality of openings 38, and moves the handle inner shaft 14 axially within the handle outer shaft 16. When one of the handle inner shaft plurality of openings 38 is again aligned with the passage through the handle outer shaft opening 36 and the positioning assembly housing opening 37, the user moves the rocking member 32 to the first position thereby again temporarily fixing the position of the inner shaft 14 axially within the handle outer shaft 16. The spring 46 is used to bias the rocking member 32 to the first position.

Figure 6:
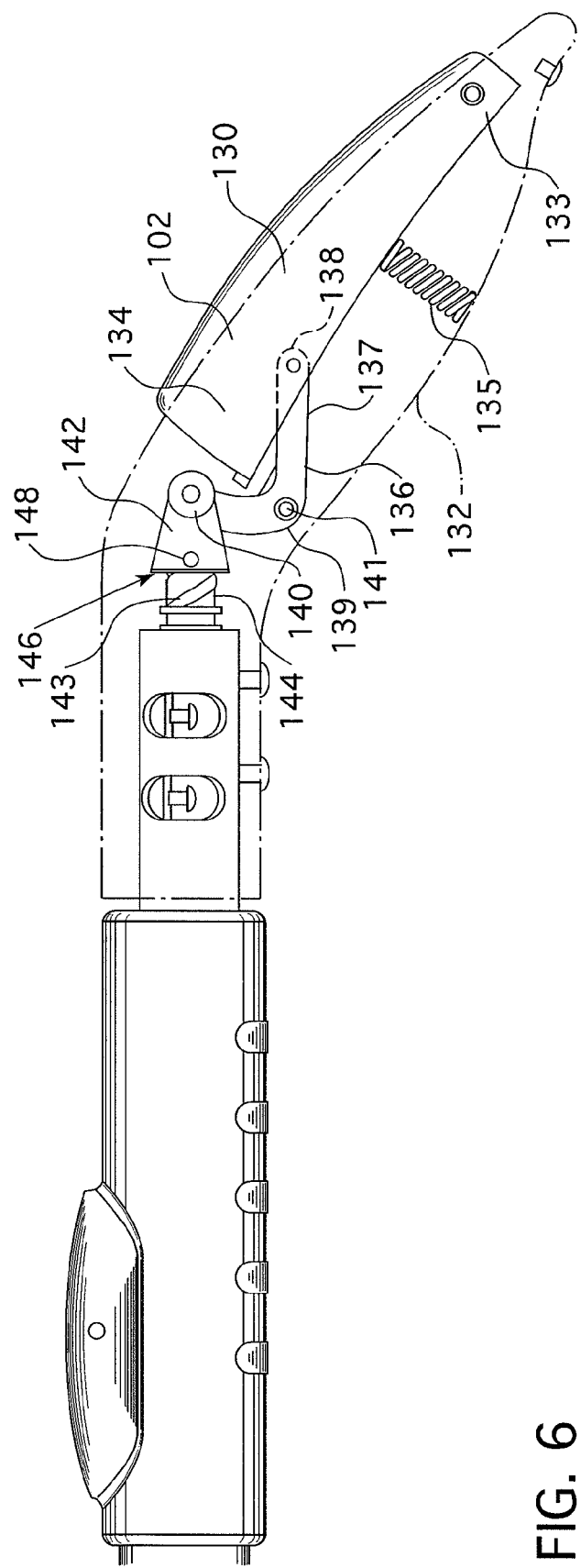
FIG. 6 is a side partially cross-sectional view of the extendable tool lower end with the actuator in the second position.
Figure 7:
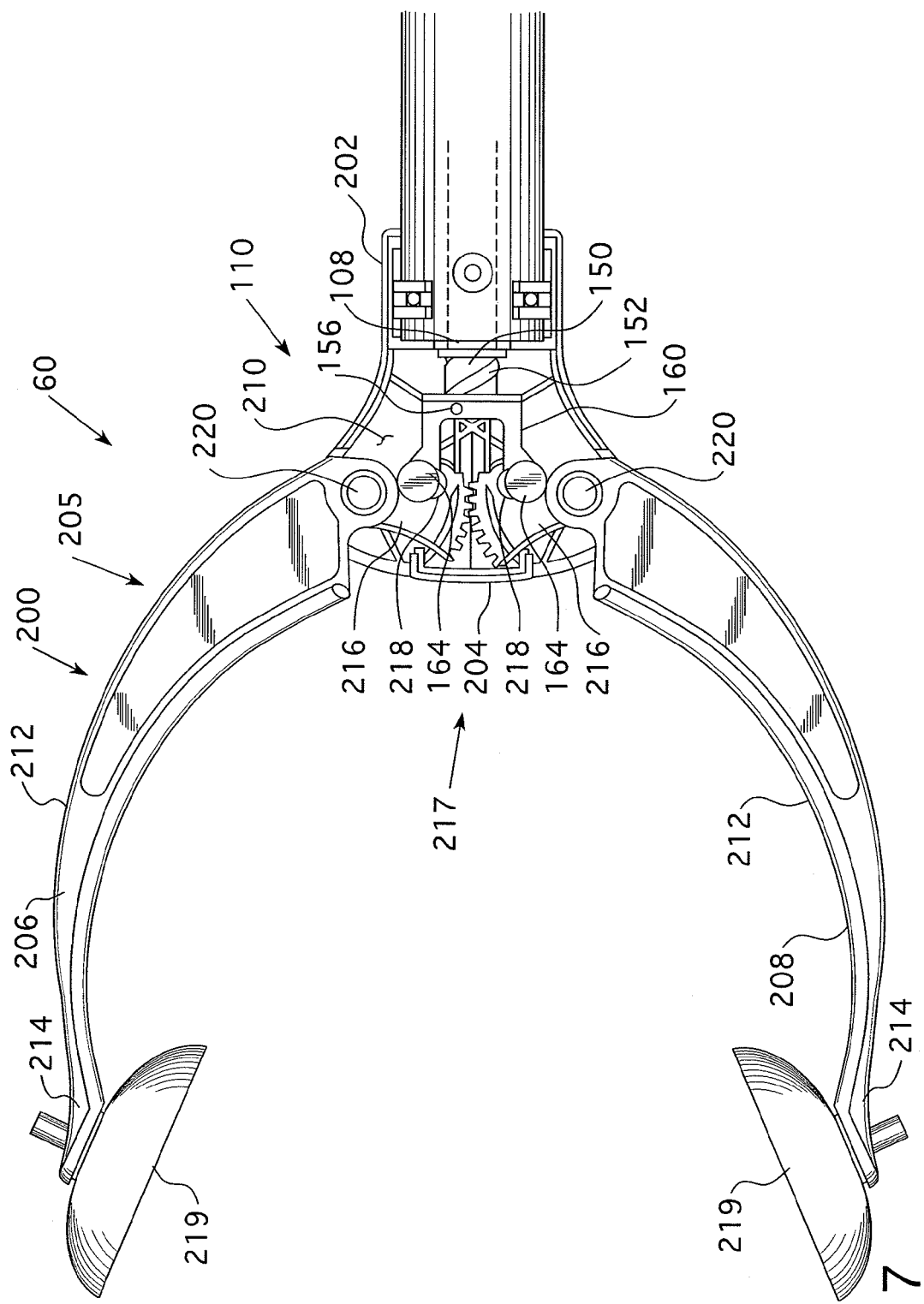
FIG. 7 is a side cross-sectional view of the extendable tool upper end with the actuatable tool head assembly in the first position.
Figure 8:
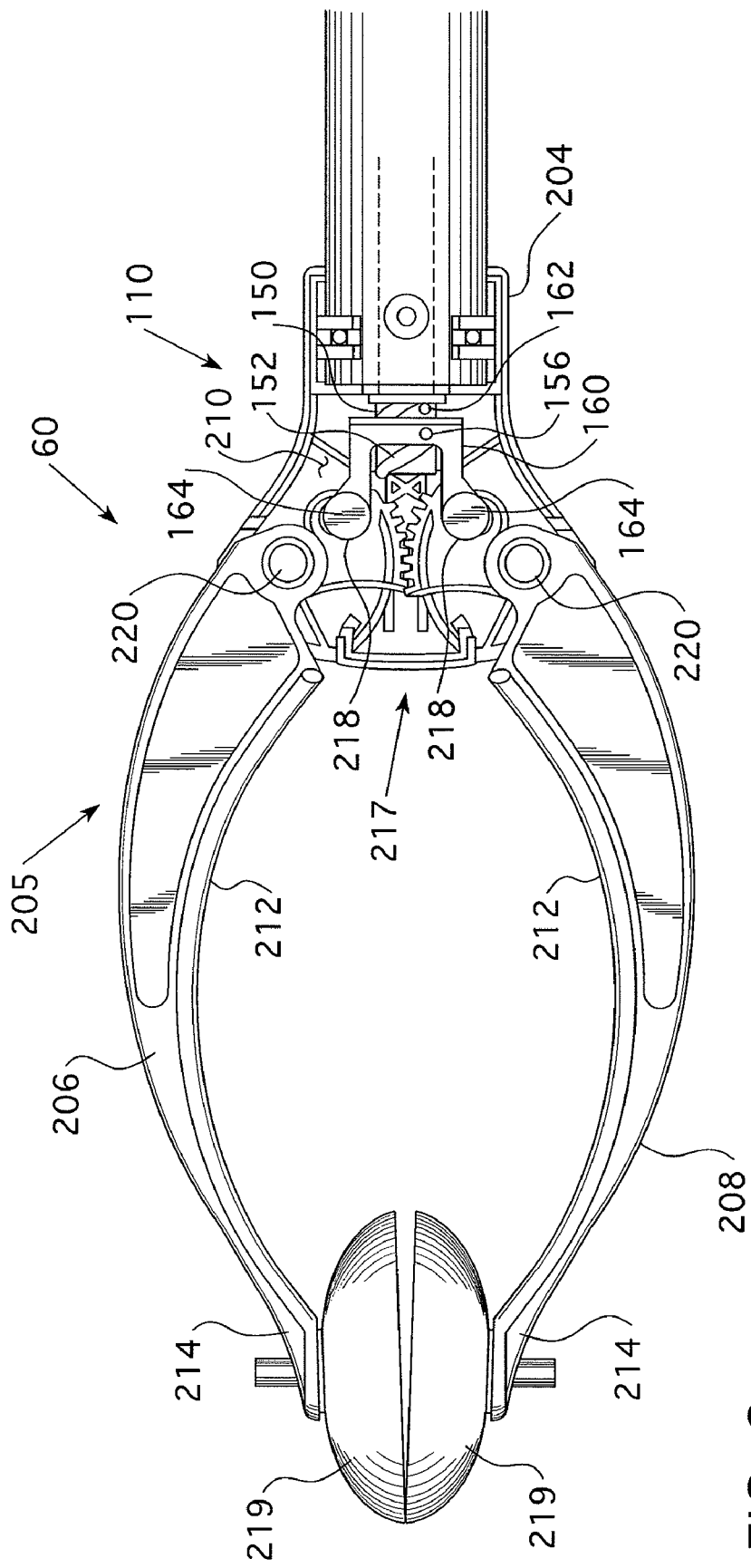
FIG. 8 is a side cross-sectional view of the extendable tool upper end with the actuatable tool head assembly in the second position.

The actuatable tool head assembly 60 (FIGS. 7 and 8) is disposed at the upper end of the extendable tool 10 and is structured to be actuated by a user provided motion applied to an actuator 102 at the lower end of the extendable tool 10. The user provided motion is transferred from the lower end of the extendable tool 10 to the upper end of the extendable tool 10 by an internal drive assembly 100 (FIG. 2). The actuator 102 may be the grip 62, noted above, disposed at the handle inner shaft lower first end 20 while the actuatable tool head assembly 60 is disposed at the handle outer shaft upper second end 26. The actuatable tool head assembly 60 includes at least one moving element 64. The actuatable tool head assembly 60 may be structured to be actuated by a rotational motion. However, as discussed below, in the preferred embodiment, the actuatable tool head assembly 60 is structured to be actuated by a generally linear motion. As such, the internal drive assembly 100 may include one or more conversion devices 104 (FIGS. 5 and 6), 110 (FIGS. 7 and 8) structured to change a rotational motion into another type of motion, e.g. a linear motion. For the following description, the actuatable tool head assembly 60 is described as a gripper having a jaw assembly 205 (FIGS. 7 and 8). It is understood, however, that any type of actuatable tool head assembly 60 may be used. Before discussing the elements and operation of the actuatable tool head assembly 60, the internal drive assembly 100 must be described.

The extendable tool 10 further includes the internal drive assembly 100, as shown in FIGS. 2-6. The internal drive assembly 100 is structured to transfer the user provided motion from the lower end of the extendable tool 10 to the upper end of the extendable tool 10. The internal drive assembly 100 includes an actuator 102, an optional lower conversion device 104, a first drive shaft 106, a second drive shaft 108, and an optional upper conversion device 110. The first drive shaft 106 and second drive shaft 108 are both elongated and rigid bodies 107, 109 respectively. One of the first drive shaft 106 or second drive shaft 108 is hollow and is an outer shaft. As with the handle shafts 14, 16, either the first drive shaft 106 or second drive shaft 108 may be the outer shaft. For the purpose of the following description, the first drive shaft 106 will be described as the outer drive shaft, however, it is understood that the configuration of the first drive shaft 106 and second drive shaft 108 may be reversed. Thus, as shown, the first drive shaft 106 is hollow and the second drive shaft 108 is sized to be disposed within, and slide axially relative to the first drive shaft 106.

The first drive shaft 106 and second drive shaft 108 are structured to maintain their orientation relative to each other. Thus, each of the first drive shaft 106 and second drive shaft 108 have an alignment structure, a first alignment structure 112 and a second alignment structure 114, respectively. As with the handle shafts, the first alignment structure 112 and second alignment structure 114 are preferably shafts having a non-circular bodies sized to have a slidable interference fit with each other. That is, the second drive shaft 108 has an inner cross-sectional area that is slightly smaller than the cross-sectional area of the first drive shaft 106 and cannot rotate freely within the first drive shaft 106. When the second drive shaft 108 is disposed within the first drive shaft 106, the second drive shaft 108 may slide axially, but a rotational motion causes the second drive shaft 108 to interface with, i.e. contact, the first drive shaft 106. Thus, the second drive shaft 108 may slide axially within the hollow first drive shaft 106, but rotation of the first drive shaft 106 causes rotation in the second drive shaft 108.

It is further noted that, in this configuration, an axial motion of either drive shaft 106, 108 is not transferred to the other drive shaft 106, 108 as the drives shafts 106, 108 slide axially relative to each other. In the preferred embodiment, the first drive shaft 106 and the second drive shaft 108 have generally square cross-sectional shapes. As before, other non-circular shapes, i.e. triangular, oval, etc. are also acceptable. Further, as with the handle shafts 14, 16, the outer first drive shaft 106 and inner second drive shaft 108 may have corresponding partially circular cross-sectional areas. That is, the inner second drive shaft 108 may have a partial circular shape with a flat 54 or a groove (not shown) and the outer first drive shaft 106 may have a partial circular shape with corresponding flat 54 or a tongue structured to fit within the groove. The drives shafts 106, 108 may also have multi-angled cross-sections, such as a star shape or a circular shape having a plurality of interfacing teeth, i.e. multiple tongues-and-grooves.

Rotational motion is applied to the first drive shaft 106 by the actuator 102. In one embodiment, FIG. 3, the actuator 102 is a twistable grip 62, as noted above. Such a grip may be a D-handle 120 having a shaft 122 extending therefrom. The D-handle shaft 122 is fixed to, or a unitary body with, the first drive shaft 106. Thus, when the user twists the D-handle 120, the first drive shaft 106, and therefore the second drive shaft 108, rotate relative to the handle shaft assembly 12. To perform this operation, the user must hold the handle shaft assembly 12 in a relatively fixed orientation, otherwise the entire extendable tool 10 will rotate when the user twists the D-handle 120. The user may grip the handle shaft assembly 12, or, a perpendicular grip (not shown) extending from the handle shaft assembly 12 may be provided. In an embodiment wherein the actuatable tool head assembly 60 is actuated by a rotational motion, the second drive shaft 108 is coupled to, and preferably directly coupled and fixed to an element within, the actuatable tool head assembly 60. Thus, a user provided rotational motion is transferred from the actuator 102 to the first drive shaft 106 and second drive shaft 108, and is then structured to actuate the actuatable tool head assembly 60.

Figure 5:
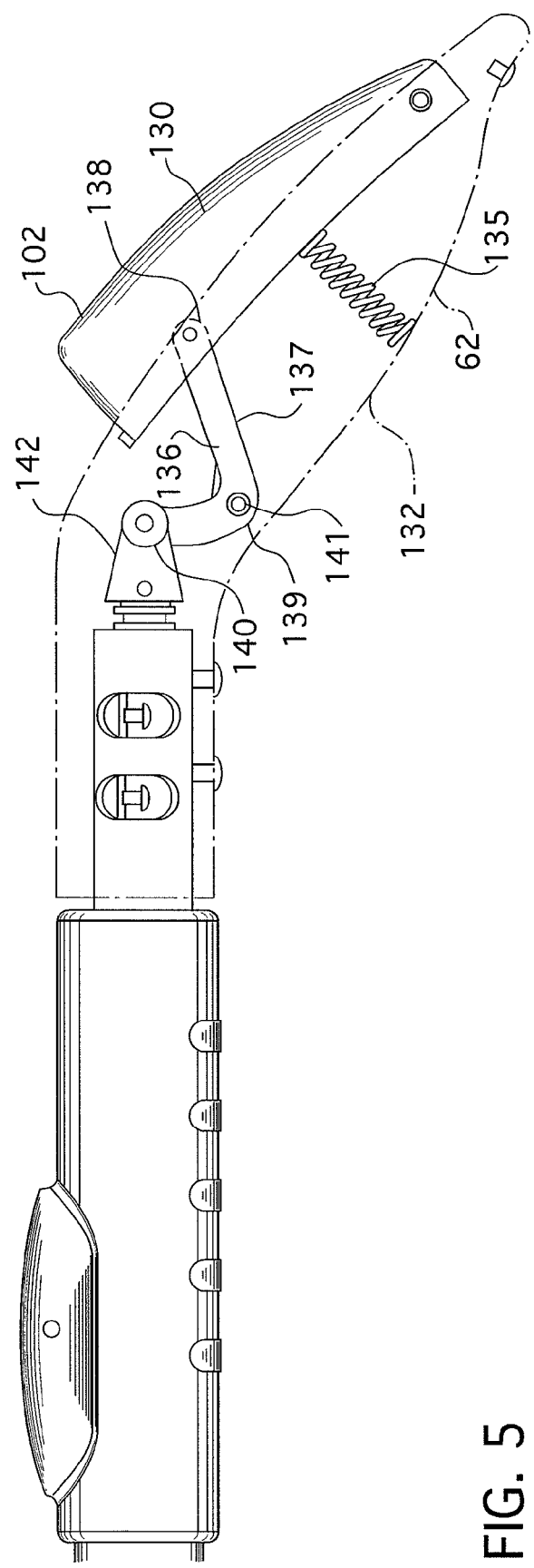
FIG. 5 is a side partially cross-sectional view of the extendable tool lower end with the actuator in the first position.

To allow for one-handed operation of the extendable tool 10, a motion other than a rotational motion must be provided by the user. Generally, a squeezing motion of one hand is the easiest motion to provide. Thus, as shown in FIGS. 5 and 6, the internal drive assembly 100 preferably includes a lower conversion device 104. The lower conversion device 104 is structured to convert a generally linear motion to a rotational motion. That is, the actuator 102 in this embodiment is a handle lever 130 pivotally coupled to a handle grip 132. The handle grip 132 is, preferably a grip housing 133 defining an enclosed space. The grip housing 133 is fixed to the handle inner shaft lower first end 20. The handle lever 130 is an elongated member having a first end 131 and a second end 134. The pivotal coupling is disposed at the handle lever first end 131. Thus, the handle lever 130 moves between a first position, wherein the handle lever second end 134 is spaced from the handle grip 132, and a second position, wherein the handle lever second end 134 is near the handle grip 132. A spring 135, disposed between the grip housing 133 and the inner surface of the handle lever 130 may bias the handle lever 130 to the first position. It is noted that the arc through which the handle lever second end 134 travels is relatively short when compared to the length of the handle lever 130. As such, the motion of the handle lever second end 134 is generally linear. The handle lever second end 134 acts upon a rocking J-shaped member 136.

The J-shaped member 136 is a generally tubular body having a straight portion 137 with a distal tip 138, a curved portion 139 with a distal tip 140, and a vertex 141 between the straight portion 137 and the curved portion 139. The rocking J-shaped member 136 is pivotally coupled to the handle grip 132 at the vertex 141. The J-shaped member straight portion distal tip 138 is pivotally coupled to the handle lever 130. The J-shaped member curved portion distal tip 140 is coupled to a translating collar 142 (described below). Thus, when the handle lever 130 moves between it's first and second positions, the J-shaped member 136 rocks between a first and second position. In the J-shaped member's 136 first position, and as shown in the figures, the straight portion 137 extends at a slightly upward angle when viewed from the side and the curved portion 139 extends at a sharply upward angle. In the J-shaped member's 136 second position, and as shown in the figures, the straight portion 137 extends generally horizontally and the curved portion 139 extends generally vertically. Thus, the J-shaped member curved portion distal tip 140 moves between a forward position and a rearward position as the J-shaped member 136 rocks between it's first and second position. As with the motion of the handle lever second end 134, while technically moving through an arc, the length of the arc is minimal compared to the length of the curved portion 139. Thus, the J-shaped member curved portion distal tip 140 moves in a generally linear manner.

The lower conversion device 104 is structured to convert a generally linear motion to a rotational motion. The lower conversion device 104 is coupled to the actuator 102. More specifically, the lower conversion device 104 includes a translating collar 142 and a generally circular rod 143, having at least one camming groove 144; the translating collar 142 has a planar circular portion 145 with a central opening 146 and a yoke 147, wherein the J-shaped member curved portion distal tip 140 is pivotally coupled to the translating collar yoke 147. The translating collar 142 includes at least one cam tooth 148 which extends from the surface of the translating collar circular portion central opening 146. There are, preferably an equal number of lower conversion device camming grooves 144 and translating collar cam teeth 148, with one cam tooth 148 per lower conversion device camming groove 144. In the preferred embodiment there are two lower conversion device camming grooves 144 and two translating collar cam teeth 148. The lower conversion device 104 generally circular rod 143 is fixed to the first drive shaft 106. The lower conversion device 104 generally circular rod 143 is, preferably, disposed within the grip housing 133 and may be rotatably coupled thereto. That is, the lower conversion device generally circular rod 143 is rotatably disposed at a fixed location within the grip housing 133. Each lower conversion device camming groove 144 extends helically about the outer surface of the lower conversion device generally circular rod 143. Preferably, the pitch of each lower conversion device camming groove 144 is between about 18.0 mm and 24.0 mm and more preferably about 22.0 mm.

When the lower conversion device 104 is assembled, the translating collar 142, and more specifically the circular portion 145, is disposed about the lower conversion device generally circular rod 143. That is, the lower conversion device generally circular rod 143 extends through the translating collar circular portion central opening 146. Each translating collar cam tooth 148 is disposed in a camming groove 144. The translating collar yoke 147 is disposed on opposing sides of the J-shaped member curved portion distal tip 140 and pivotally coupled thereto. In this configuration, the translating collar 142 may not rotate.

Accordingly, the lower conversion device 104 operates as follows. When the user squeezes the actuator 102, the handle lever 130 moves from the first position, wherein the handle lever second end 134 is spaced from the handle grip 132, to the second position, wherein the handle lever second end 134 is near the handle grip 132. This causes the J-shaped member curved portion distal tip 140 to move from a forward position to the rearward position as described above. As the J-shaped member curved portion distal tip 140 is moved rearwardly, the translating collar cam teeth 148 engage the camming grooves 144 and cause the lower conversion device generally circular rod 143 to rotate. As the lower conversion device generally circular rod 143 is fixed to the first drive shaft 106, rotation of the lower conversion device generally circular rod 143 causes the first drive shaft 106 to rotate as well. As set forth above, when the first drive shaft 106 rotates, the second drive shaft 108 rotates also. When the user releases the handle lever 130, the actuator spring 135 causes the handle lever 130 to return to the first position. Accordingly, the J-shaped member curved portion distal tip 140 is moved forwardly, and as the translating collar cam teeth 148 engage the camming grooves 144, the lower conversion device generally circular rod 143 rotates in the opposite direction.

Thus, the lower conversion device 104 is coupled to the actuator 102 and is acted upon by the generally linear motion provided by the actuator 102. The lower conversion device 104 converts that generally linear motion into a rotational motion at the lower conversion device generally circular rod 143. The lower conversion device generally circular rod 143 is fixed to the first drive shaft 106. Thus, when the user squeezes the actuator 102, the first drive shaft 106, and therefore the second drive shaft 108, rotate as well.

Unless the actuatable tool head assembly 60 utilizes a rotational motion, in which case the second drive shaft 108 may be coupled thereto as described above, the rotational motion of the second drive shaft 108 must be converted into another type of motion, typically a linear motion. Accordingly, as shown in FIGS. 7 and 8 an upper conversion device 110 is disposed at the handle outer shaft upper second end 26 between, and coupled to both, the second drive shaft 108 and the actuatable tool head assembly 60. The upper conversion device 110 includes a generally circular rod 150, having at least one camming groove 152, and a translating bracket 154 with at least one cam tooth 156. As with the lower conversion device 104 there are preferably an equal number of, and more preferably two, upper conversion device camming grooves 152 with one translating bracket cam tooth 156 per upper conversion device camming groove 152. The upper conversion device circular rod 150 is fixed to the second drive shaft 108 adjacent the handle outer shaft upper second end 26. The upper conversion device circular rod 150 may be disposed within, and rotatably couple to, the actuatable tool head assembly housing 204, described below, if present. Each upper conversion device camming groove 152 extends helically about the outer surface of the upper conversion device circular rod 150. Preferably, the pitch of each upper conversion device camming groove 152 is between about 18.0 mm and 24.0 mm and more preferably about 22.0 mm.

The translating bracket 154 is structured to move axially relative to the second drive shaft 108 while maintaining its orientation relative to the outer handle shaft 16. This may be accomplished in various ways, e.g. two spaced rods (not shown) extending from the handle outer shaft upper second end 26 with the translating bracket 154 slidably disposed thereon. In the preferred embodiment, however, the actuatable tool head assembly housing 204 defines a path of travel for the translating bracket 154. That is, the translating bracket 154 is slidably coupled to the actuatable tool head assembly housing 204. The translating bracket 154 has a body 160 defining a generally circular opening 162. The translating bracket at least one cam tooth 156 extends from the translating bracket body 160 radially into the generally circular opening 162.

When the upper conversion device circular rod 150 is disposed through the translating bracket generally circular opening 162, the translating bracket at least one cam tooth 156 extends into the upper conversion device circular rod at least one camming groove 152. When the upper conversion device circular rod 150 rotates, e.g. in response to the second drive shaft 108 rotating, each upper conversion device camming groove 152 engages the translating bracket cam tooth 156 in a camming manner and causes the translating bracket 154 to move in a generally linear manner. Thus, the upper conversion device 110 is structured to convert a rotational motion to a generally linear motion. The translating bracket 154 also may include mounting points 164 structured to be coupled with, and provide a motion to, one or more movable elements of the actuatable tool head assembly 60.

As noted above, the following description of the actuatable tool head assembly 60 shall use a gripping device 200 as an example. In this example, the jaw members 206, 208 (described below) are the at least one moving element 64. As shown, the actuatable tool head assembly 60 includes a mount 202, which is preferably a housing 204, and a jaw assembly 205 having a first jaw member 206 and a second jaw member 208. The actuatable tool head assembly housing 204 preferably defines an enclosed space 210. At least one jaw member 206, 208 is movable and, as shown, both jaw members 206, 208 are movable. Each jaw member 206, 208 includes a generally planar, curved body 212 having a distal end 214 and proximal end 216. Each jaw member distal end 214 may include an additional gripping feature such as, but not limited to, slip-resistant pads (not shown) or tip cups 219. Each jaw member proximal end 216 has an arcuate and toothed surface 217. The jaw member proximal end toothed surfaces 217 are structured to engage each other in a gear-like manner. Further, each jaw member proximal end 216 has a coupling mount 219 structured to be coupled to the translating bracket mounting points 164. Each jaw member proximal end 216 is structured to be pivotally coupled to the actuatable tool head assembly housing 204. Each jaw member proximal end pivotal coupling 217 is disposed between the jaw member proximal end coupling mount 219 and the jaw member distal end 214. Thus, a force applied to a jaw member proximal end 216 will cause the jaw member 206, 208 to rotate about the jaw member proximal end pivotal coupling 217, so long as the force is not applied in a direction directly through the jaw member proximal end pivotal coupling 217.

When assembled, the jaw members 206, 208 are positioned in a pincer-like configuration with each jaw member proximal end 216 disposed within, and pivotally coupled to, the actuatable tool head assembly housing 204. The jaw members 206, 208 are structured to move between an open, first position, wherein the jaw member distal ends 214 are spaced, and a closed, second position, wherein the jaw member distal ends 214 contact each other, or are substantially adjacent each other. The jaw member proximal end toothed surfaces 220 engage each other in a gear-like manner. Thus, the movement of one jaw member 206, 208 causes the other jaw member 206, 208 to move as well. The translating bracket 154 is coupled, via the translating bracket mounting points 164, to each jaw member proximal end coupling mount 218. When the translating bracket 154 moves, the translating bracket 154 applies a force to each jaw member proximal end 216. This force is not applied in a direction directly through the jaw member proximal end pivotal coupling 220. Therefore, the force applied by the translating bracket 154 causes each jaw member 206, 208 to pivot between the open, first position and the closed, second position.

Thus, when the preferred embodiment of the extendable tool 10 is fully assembled, the user may actuate the jaw assembly 205 by squeezing the actuator 102. That is, as described above, linear movement of the actuator 102 at the lower end of the extendable tool 10 is converted to a rotational motion by the internal drive assembly 100 before being converted back to a linear motion at the upper end of the extendable tool 10. The linear motion caused by the internal drive assembly 100 is used by the actuatable tool head assembly 60, in this embodiment a gripper 200, to cause the jaw members 206, 208 to move between the open and closed positions. It is noted that, in the general embodiment of an actuatable tool head assembly 60 with at least one moving element 64, the upper conversion device 110 converts a rotational motion in the second drive shaft 108 to a generally linear motion whereupon the generally linear motion is provided to, and acts upon, the actuatable tool head assembly a least one moving element 64. That is the translating bracket 154 is coupled to the actuatable tool head assembly a least one moving element 64.

Further, when a user desires to extend the extendable tool 10, the user releases the positioning assembly 18, as described above, and adjusts the length of the shaft assembly 12 as desired. As noted above, the first and upper conversion device circular rod 143, 150 are each rotatably coupled to a housing 133, 204, respectively, which are fixed to the handle inner shaft 14 and the handle outer shaft 16, respectively. The lower and upper conversion device circular rod 143, 150 are also fixed to the first drive shaft 106 and second drive shaft 108, respectively. Thus, when the length of the shaft assembly 12 is adjusted, the handle inner shaft 14 and the handle outer shaft 16 move relative to each other. Thus, the housing 133, 204 and the first and upper conversion device circular rod 143, 150 also move relative to each other. This in turn causes the first drive shaft 106 and second drive shaft 108 to slide axially relative to each other. Thus, without the use of a complicated internal drive assembly locking device or similar assembly, the combined relative length of the first drive shaft 106 and second drive shaft 108 may be adjusted.

While specific embodiments of the invention have been described in detail, it will be appreciated by those skilled in the art that various modifications and alternatives to those details could be developed in light of the overall teachings of the disclosure. For example, instead of two moving jaw members 206, 208, the device could have a fixed jaw (not shown) and a single moving jaw (not shown). In such an embodiment, the internal drive assembly 100 would only act upon the moving jaw. Accordingly, the particular arrangements disclosed are meant to be illustrative only and not limiting as to the scope of the invention which is to be given the full breadth of the claims appended and any and all equivalents thereof.

What is claimed is:

1. An internal drive assembly for an extendable tool having an actuatable tool head assembly with at least one moving element, said extendable tool having a handle shaft assembly with an inner shaft, an outer shaft, and a positioning assembly, said inner shaft being slidably disposed within said outer shaft and axially movable between a plurality of positions whereby said extendable tool may be configured to have different lengths, said positioning assembly structured to maintain said inner shaft and said outer shaft in a temporarily fixed relationship, said internal drive assembly for an extendable tool comprising:
   an actuator structured to be coupled to said shaft assembly, said actuator structured to move between a first position and a second position;
   a hollow, first drive shaft having a first alignment structure, said first drive shaft coupled to said actuator and structured to rotate in response to said actuator moving between said first and second positions;
   a second drive shaft having a second alignment structure, said second drive shaft sized to be slidably disposed within said hollow first drive shaft;
   wherein, when said second drive shaft is at least partially disposed in said hollow first drive shaft, said first alignment structure and said second alignment structure interface so that the orientation of said hollow first drive shaft and said second drive shaft remains substantially fixed;
   said second drive shaft being coupled to, and structured to actuate, said actuatable tool head assembly;
   said hollow first drive shaft has a non-circular body, said hollow first drive shaft non-circular body defining said first alignment structure;
   said second drive shaft has a non-circular body sized to have a slidable interference fit with said hollow first drive shaft non-circular body, said second drive shaft non-circular body defining said second alignment structure; and
   wherein said second drive shaft may slide axially within said hollow first drive shaft, but wherein rotation of said first drive shaft causes rotation in said second drive shaft.

2. The internal drive assembly for an extendable tool of claim 1 wherein:
   said hollow first drive shaft body has a generally square cross-sectional area; and
   said second drive shaft body has a generally square cross-sectional area.

3. An internal drive assembly for an extendable tool having an actuatable tool head assembly with at least one moving element, said extendable tool having a handle shaft assembly with an inner shaft, an outer shaft, and a positioning assembly, said inner shaft being slidably disposed within said outer shaft and axially movable between a plurality of positions whereby said extendable tool may be configured to have different lengths, said positioning assembly structured to maintain said inner shaft and said outer shaft in a temporarily fixed relationship, wherein said actuatable tool head assembly is structured to be actuated by a generally linear motion, said internal drive assembly for an extendable tool comprising:
   an actuator structured to be coupled to said shaft assembly, said actuator structured to move between a first position and a second position;
   a hollow, first drive shaft having a first alignment structure, said first drive shaft coupled to said actuator and structured to rotate in response to said actuator moving between said first and second positions;
   a second drive shaft having a second alignment structure, said second drive shaft sized to be slidably disposed within said hollow first drive shaft;
   wherein, when said second drive shaft is at least partially disposed in said hollow first drive shaft, said first alignment structure and said second alignment structure interface so that the orientation of said hollow first drive shaft and said second drive shaft remains substantially fixed; and
   said second drive shaft being coupled to, and structured to actuate, said actuatable tool head assembly;
   an upper conversion device, said upper conversion device structured to convert a rotational motion to a generally linear motion, said upper conversion device coupled to said second drive shaft and said actuatable tool head assembly;
   wherein said upper conversion device converts a rotational motion in said second drive shaft to a generally linear motion, said generally linear motion acting upon said actuatable tool head assembly at least one moving element.

4. The internal drive assembly for an extendable tool of claim 3 wherein:
   said upper conversion device includes a generally circular rod with at least one camming groove and a translating bracket with at least one cam tooth;
   said circular rod rotatably coupled to said actuatable tool head assembly and fixed to said second shaft body;
   said translating bracket slidably coupled to said actuatable tool head assembly and structured to translate relative thereto between a first position and a second position;
   said translating bracket disposed about said circular rod with said at least one cam tooth disposed in said at least one camming groove;
   said actuatable tool head assembly at least one moving element coupled to said translating bracket; and
   wherein said actuatable tool head assembly at least one moving element is structured to move in response to said translating bracket moving between said first position and a second position.

5. The internal drive assembly for an extendable tool of claim 4 wherein said upper conversion device circular rod is rotatably disposed at a fixed location on said actuatable tool head assembly.

6. The internal drive assembly for an extendable tool of claim 4 wherein:
said actuator is structured to be actuated by a squeezing motion of the user's hand, said actuator moving between a first position and a second position and providing a generally linear motion;
said internal drive assembly for an extendable tool further comprising:
a lower conversion device, said lower conversion device structured to convert a generally linear motion to a rotational motion, said lower conversion device coupled to said actuator; and
said first drive shaft coupled to said lower conversion device and structured to rotate in response to said actuator moving between said first and second positions.

7. The internal drive assembly for an extendable tool of claim 6 wherein:
said lower conversion device includes a generally circular rod with at least one camming groove and a translating collar with at least one cam tooth;
said lower conversion device circular rod rotatably coupled to said actuator and fixed to said second shaft body;
said translating collar slidably coupled to said shaft assembly and structured to translate relative thereto between a first position and a second position;
said translating collar disposed about said lower conversion device circular rod with said at least one cam tooth disposed in said at least one camming groove; and
wherein said lower conversion device circular rod is structured to rotate as said actuator moves between said first and second positions.

8. The internal drive assembly for an extendable tool of claim 7 wherein said handle shaft assembly includes a handle grip fixed to the lower end of said handle shaft assembly and wherein;
said actuator includes a handle lever and a J-shaped member;
said handle lever being an elongated member having a first end and a second end, said handle lever being pivotally coupled at said first end to said handle grip;
said handle lever structured to move between a first position, wherein said handle lever second end is spaced from said handle grip, and a second position, wherein said handle lever second end is near said handle grip, and wherein the motion of said handle lever second end is generally linear;
said J-shaped member being a generally tubular body having a straight portion with a distal tip, a curved portion with a distal tip, and a vertex between said straight portion and said curved portion, said J-shaped member being pivotally coupled to said handle grip at said vertex, whereby said J-shaped member may rock between a first and second position and whereby said J-shaped member curved portion distal tip moves generally linearly between a forward position and a rearward position as said J-shaped member rocks between its first and second position;
said J-shaped member straight portion distal tip being pivotally coupled to said handle lever;
said J-shaped member curved portion distal tip being coupled to said translating collar; and
wherein, as said handle lever moves between its first and second position, said J-shaped member moves between its first and second position, and said J-shaped member curved portion distal tip moves generally linearly between its forward position and a rearward position causing said translating collar to move generally linearly between its first and second positions.

9. An internal drive assembly for an extendable tool having an actuatable tool head assembly with at least one moving element, said extendable tool having a handle shaft assembly with an inner shaft, an outer shaft, and a positioning assembly, said inner shaft being slidably disposed within said outer shaft and axially movable between a plurality of positions whereby said extendable tool may be configured to have different lengths, said positioning assembly structured to maintain said inner shaft and said outer shaft in a temporarily fixed relationship, wherein said actuatable tool head assembly is structured to be actuated by a generally linear motion said internal drive assembly for an extendable tool comprising:
an actuator structured to be coupled to said shaft assembly, said actuator structured to move between a first position and a second position;
a hollow, first drive shaft having a first alignment structure, said first drive shaft coupled to said actuator and structured to rotate in response to said actuator moving between said first and second positions;
a second drive shaft having a second alignment structure, said second drive shaft sized to be slidably disposed within said hollow first drive shaft;
wherein, when said second drive shaft is at least partially disposed in said hollow first drive shaft, said first alignment structure and said second alignment structure interface so that the orientation of said hollow first drive shaft and said second drive shaft remains substantially fixed;
said second drive shaft being coupled to, and structured to actuate, said actuatable tool head assembly;
a lower conversion device, said lower conversion device structured to convert a generally linear motion to a rotational motion, said lower conversion device coupled to said actuator;
said first drive shaft coupled to said lower conversion device and structured to rotate in response to said actuator moving between said first and second positions;
an upper conversion device, said upper conversion device structured to convert a rotational motion to a generally linear motion, said upper conversion device coupled to said second drive shaft and said actuatable tool head assembly; and
wherein said upper conversion device converts a rotational motion in said second drive shaft to a generally linear motion, said generally linear motion acting upon said actuatable tool head assembly at least one moving element.

10. An extendable tool comprising:
a handle shaft assembly with an inner shaft, an outer shaft, and a positioning assembly;
an internal drive assembly disposed within said handle shaft assembly;
an actuatable tool head assembly with at least one moving element, said actuatable tool head assembly coupled to said handle shaft assembly and structured to be actuated by said internal drive assembly;
said inner shaft being slidably disposed within said outer shaft and axially movable between a plurality of positions whereby said extendable tool may be configured to have different lengths;
said positioning assembly structured to maintain said inner shaft and said outer shaft in a temporarily fixed relationship;

said internal drive assembly including an actuator, a first drive shaft, and a second drive shaft;

said actuator structured to be coupled to said shaft assembly, said actuator structured to move between a first position and a second position;

said first drive shaft being hollow and having a first alignment structure, said first drive shaft coupled to said actuator and structured to rotate in response to said actuator moving between its first and second positions;

said second drive shaft having a second alignment structure, said second drive shaft sized to be slidably disposed within said hollow first drive shaft;

wherein, when said second drive shaft is at least partially disposed in said hollow first drive shaft, said first alignment structure and said second alignment structure interface so that the orientation of said hollow first drive shaft and said second drive shaft remains substantially fixed;

said second drive shaft being coupled to, and structured to actuate, said actuatable tool head assembly;

said hollow first drive shaft has a non-circular body, said hollow first drive shaft non-circular body defining said first alignment structure;

said second drive shaft has a non-circular body sized to have a slidable interference fit with said hollow first drive shaft non-circular body, said second drive shaft non-circular body defining said second alignment structure; and wherein said second drive shaft may slide axially within said hollow first drive shaft, but wherein rotation of said first drive shaft causes rotation in said second drive shaft.

11. The extendable tool of claim 10 wherein:

said hollow first drive shaft body has a generally square cross-sectional area; and said second drive shaft body has a generally square cross-sectional area.

12. An extendable tool comprising:

a handle shaft assembly with an inner shaft, an outer shaft, and a positioning assembly;

an internal drive assembly disposed within said handle shaft assembly;

an actuatable tool head assembly with at least one moving element, said actuatable tool head assembly coupled to said handle shaft assembly and structured to be actuated by said internal drive assembly;

said inner shaft being slidably disposed within said outer shaft and axially movable between a plurality of positions whereby said extendable tool may be configured to have different lengths;

said positioning assembly structured to maintain said inner shaft and said outer shaft in a temporarily fixed relationship;

said internal drive assembly including an actuator, a first drive shaft, and a second drive shaft;

said actuator structured to be coupled to said shaft assembly, said actuator structured to move between a first position and a second position;

said first drive shaft being hollow and having a first alignment structure, said first drive shaft coupled to said actuator and structured to rotate in response to said actuator moving between its first and second positions;

said second drive shaft having a second alignment structure, said second drive shaft sized to be slidably disposed within said hollow first drive shaft;

wherein, when said second drive shaft is at least partially disposed in said hollow first drive shaft, said first alignment structure and said second alignment structure interface so that the orientation of said hollow first drive shaft and said second drive shaft remains substantially fixed;

said second drive shaft being coupled to, and structured to actuate, said actuatable tool head assembly;

said actuatable tool head assembly is structured to be actuated by a generally linear motion;

said internal drive assembly includes an upper conversion device;

said upper conversion device structured to convert a rotational motion to a generally linear motion, said upper conversion device coupled to said second drive shaft and said actuatable tool head assembly;

wherein said upper conversion device converts a rotational motion in said second drive shaft to a generally linear motion, said generally linear motion acting upon said actuatable tool head assembly a least one moving element.

13. The extendable tool of claim 12 wherein:

said upper conversion device includes a generally circular rod with at least one camming groove and a translating bracket with at least one cam tooth;

said circular rod rotatably coupled to said actuatable tool head assembly and fixed to said second shaft body;

said translating bracket slidably coupled to said actuatable tool head assembly and structured to translate relative thereto between a first position and a second position;

said translating bracket disposed about said circular rod with said at least one cam tooth disposed in said at least one camming groove;

said actuatable tool head assembly at least one moving element coupled to said translating bracket; and wherein said actuatable tool head assembly at least one moving element is structured to move in response to said translating bracket moving between said first position and a second position.

14. The extendable tool of claim 13 wherein said upper conversion device circular rod is rotatably disposed at a fixed location on said actuatable tool head assembly.

15. The extendable tool of claim 13 wherein:

said actuator is structured to be actuated by a squeezing motion of the user's hand, said actuator moving between a first position and a second position and providing a generally linear motion;

said internal drive assembly for an extendable tool includes a lower conversion device;

said lower conversion device structured to convert a generally linear motion to a rotational motion, said lower conversion device coupled to said actuator; and said first drive shaft coupled to said lower conversion device and structured to rotate in response to said actuator moving between said first and second positions.

16. The extendable tool of claim 15 wherein:

said lower conversion device includes a generally circular rod with at least one camming groove and a translating collar with at least one cam tooth;

said lower conversion device circular rod rotatably coupled to said actuator and fixed to said second shaft body;

said translating collar slidably coupled to said shaft assembly and structured to translate relative thereto between a first position and a second position;

said translating collar disposed about said lower conversion device circular rod with said at least one cam tooth disposed in said at least one caroming groove; and wherein said lower conversion device circular rod is structured to rotate as said actuator moves between said first and second positions.

17. The extendable tool of claim 16 wherein:

said handle shaft assembly includes a handle grip fixed to the lower end of said handle shaft assembly;

said actuator includes a handle lever and a J-shaped member;

said handle lever being an elongated member having a first end and a second end, said handle lever being pivotally coupled at said first end to said handle grip;

said handle lever structured to move between a first position, wherein said handle lever second end is spaced from said handle grip, and a second position, wherein said handle lever second end is near said handle grip, and wherein the motion of said handle lever second end is generally linear;

said J-shaped member being a generally tubular body having a straight portion with a distal tip, a curved portion with a distal tip, and a vertex between said straight portion and said curved portion, said J-shaped member being pivotally coupled to said handle grip at said vertex, whereby said J-shaped member may rock between a first and second position and whereby said J-shaped member curved portion distal tip moves generally linearly between a forward position and a rearward position as said J-shaped member rocks between its first and second position;

said J-shaped member straight portion distal tip being pivotally coupled to said handle lever;

said J-shaped member curved portion distal tip being coupled to said translating collar; and wherein, as said handle lever moves between its first and second position, said J-shaped member moves between its first and second position, and said J-shaped member curved portion distal tip moves generally linearly between its forward position and a rearward position causing said translating collar to move generally linearly between its first and second positions.

18. An extendable tool comprising:

a handle shaft assembly with an inner shaft, an outer shaft, and a positioning assembly;

an internal drive assembly disposed within said handle shaft assembly;

an actuatable tool head assembly with at least one moving element, said actuatable tool head assembly coupled to said handle shaft assembly and structured to be actuated by said internal drive assembly;

said inner shaft being slidably disposed within said outer shaft and axially movable between a plurality of positions whereby said extendable tool may be configured to have different lengths;

said positioning assembly structured to maintain said inner shaft and said outer shaft in a temporarily fixed relationship;

said internal drive assembly including an actuator, a first drive shaft, and a second drive shaft;

said actuator structured to be coupled to said shaft assembly, said actuator structured to move between a first position and a second position;

said first drive shaft being hollow and having a first alignment structure, said first drive shaft coupled to said actuator and structured to rotate in response to said actuator moving between its first and second positions;

said second drive shaft having a second alignment structure, said second drive shaft sized to be slidably disposed within said hollow first drive shaft;

wherein, when said second drive shaft is at least partially disposed in said hollow first drive shaft, said first alignment structure and said second alignment structure interface so that the orientation of said hollow first drive shaft and said second drive shaft remains substantially fixed; and said second drive shaft being coupled to, and structured to actuate, said actuatable tool head assembly;

said actuatable tool head assembly is structured to be actuated by a generally linear motion;

said internal drive assembly includes a lower conversion device and an upper conversion device;

said lower conversion device structured to convert a generally linear motion to a rotational motion, said lower conversion device coupled to said actuator;

said first drive shaft coupled to said lower conversion device and structured to rotate in response to said actuator moving between said first and second positions;

said upper conversion device structured to convert a rotational motion to a generally linear motion, said upper conversion device coupled to said second drive shaft and said actuatable tool head assembly; and wherein said upper conversion device converts a rotational motion in said second drive shaft to a generally linear motion, said generally linear motion acting upon said actuatable tool head assembly at least one moving element.

19. The extendable tool of claim 18 wherein:

said actuatable tool head assembly is a gripping device having a housing and a jaw assembly;

said actuatable tool head assembly housing fixed to said inner shaft upper end, said actuatable tool head assembly housing defining an enclosed space;

said jaw assembly including a first jaw member and a second jaw member;

each said jaw member having a generally planar, curved body having a distal end, proximal end, and a pivotal coupling mount;

each said jaw member proximal end having an arcuate and toothed surface, said jaw member proximal end toothed surfaces structured to engage each other;

each said jaw member pivotal coupling mount disposed between said jaw member distal end and said jaw member proximal end;

said jaw member pivotal coupling mount pivotally coupled to said actuatable tool head assembly housing with said jaw member proximal end toothed surfaces engaging each other;

said upper conversion device coupled to, and structured to provide a linear motion to, each said jaw member proximal end; and whereby said jaw members are structured to move between an open, first position, wherein the jaw member distal ends are spaced, and a closed, second position, wherein the jaw member distal ends are substantially adjacent each other.

* * * * *

UNITED STATES PATENT AND TRADEMARK OFFICE
CERTIFICATE OF CORRECTION

| | | |
|---|---|---|
| PATENT NO. | : 8,061,751 B2 | Page 1 of 1 |
| APPLICATION NO. | : 12/412858 | |
| DATED | : November 22, 2011 | |
| INVENTOR(S) | : Stephen D. Hatcher | |

It is certified that error appears in the above-identified patent and that said Letters Patent is hereby corrected as shown below:

Front page, first column, "Stephen D Hatcher" should read --Stephen D. Hatcher--.
Column 1, lines 23 - 24, "assemblies as used herein." should read --assemblies.--.
Column 2, line 55, "detail view" should read --detailed view--.
Column 3, line 58, "retracted first, position," should read --retracted, first position,--.
Column 4, line 50, "a oval" should read --an oval--.
Column 6, line 23, "having a" should read --having--.
Column 6, line 38, "drives shaft" should read --drive shaft--.
Column 6, line 49, "drives shaft" should read --drive shaft--.
Column 7, line 43, "between it's first" should read --between its first--.
Column 7, line 54, "between it's first" should read --between its first--.
Column 10, line 54, "a least" should read --at least--.
Column 10, line 55, "That is the" should read --That is, the--.
Column 10, line 56, "a least" should read --at least--.
Column 11, line 59, "defming" should read --defining--.
Column 16, line 17, "a least" should read --at least--.
Column 16, line 64, "one caroming groove" should read --one camming groove--.

Signed and Sealed this
Twenty-seventh Day of March, 2012

David J. Kappos
*Director of the United States Patent and Trademark Office*